US008233680B2

(12) United States Patent
Bringer et al.

(10) Patent No.: US 8,233,680 B2
(45) Date of Patent: Jul. 31, 2012

(54) METHOD OF INDENTIFYING AN INDIVIDUAL

(75) Inventors: Julien Bringer, Paris (FR); Herve Chabanne, Paris (FR)

(73) Assignee: Morpho, Paris (FR)

( * ) Notice: Subject to any disclaimer, the term of this patent is extended or adjusted under 35 U.S.C. 154(b) by 765 days.

(21) Appl. No.: 12/373,156

(22) PCT Filed: Jul. 9, 2007

(86) PCT No.: PCT/EP2007/006082
§ 371 (c)(1),
(2), (4) Date: Apr. 27, 2009

(87) PCT Pub. No.: WO2008/006537
PCT Pub. Date: Jan. 17, 2008

(65) Prior Publication Data
US 2009/0274344 A1    Nov. 5, 2009

(30) Foreign Application Priority Data

Jul. 10, 2006 (FR) ...................................... 06 06290

(51) Int. Cl.
*G06K 9/00* (2006.01)
(52) U.S. Cl. ........................................ 382/124; 382/294
(58) Field of Classification Search .................. 382/124, 382/284, 294
See application file for complete search history.

(56) References Cited

U.S. PATENT DOCUMENTS

| | | | | |
|---|---|---|---|---|
| 5,715,316 A | * | 2/1998 | Steenblik et al. | 380/54 |
| 5,825,482 A | * | 10/1998 | Nikoonahad et al. | 356/237.2 |
| 6,343,150 B1 | * | 1/2002 | Darrell et al. | 382/218 |
| 7,260,246 B2 | * | 8/2007 | Fujii | 382/124 |
| 8,009,326 B2 | * | 8/2011 | Roskind et al. | 358/1.9 |
| 2006/0177060 A1 | * | 8/2006 | Johnson et al. | 380/255 |

OTHER PUBLICATIONS

Lin C-C et al.: "Visual cryptography for gray-level images by dithering techniques"; Pattern Recognition Letters, North-Holland Publ. Amsterdam, NL, vol. 24, No. 1-3, Jan. 2003; pp. 349-358.
Naor M. et al.: "Visual cryptography" Advances in Cryptology, Eurocrypt; May 12, 1994, pp. 1-12.
Naor M. et al.: "Visual cryptography II: Improving the contrast via the cover base"; Lecture Notes in Computer Science; Springer Verlag, Berlin, Germany; vol. 1189, 1997; pp. 1-11.
Zhi Zhou et al.: "Halftone visual cryptography"; Proceedings 2003 International Conference on Image Processing; ICIP-2003; Barcelona, Spain; Sep. 14-17, 2003; International Conference on Image Processing, New Yor, NY: IEEE, US; vol. 2 of 3; Sep. 14, 2003; pp. 521-524.
Naor M et al. International Association for Cryptologic Research (EDS GOOS G et al.); "Visual Authentication and Identification" Advances in Cryptology—Crypto '97; Santa Barbara, Aug. 17-21, 1997, Proceedings of the Annual International Cryptology Conference (Crypto), Berlin, Springer, Germany, vol. Conf. 17, Aug. 17, 1997; pp. 322-336.
Maltoni D et al.: "Handbook of fingerprint recognition, enhancement"; New York: Springer Verlag, US, 2003, p. 88. Han J-W et al.: "Optical Image Encryption Based on XOR Operations"; Optical Engineering, Soc. of Photo-Optical Instrumentation Engineers; Bellingham, US; vol. 38, No. 1, Jan. 1999, pp. 47-54.

* cited by examiner

*Primary Examiner* — John Strege
(74) *Attorney, Agent, or Firm* — Gerald E. Helget; Briggs and Morgan, P.A.

(57) ABSTRACT

A method of identifying an individual in which captured images are encrypted by a transformation function and superimposed over previously recorded encrypted images. The superimposition image thus formed is used for identity verification. If the verification is negative a looping step repeats the process until positive verification is achieved.

7 Claims, 9 Drawing Sheets

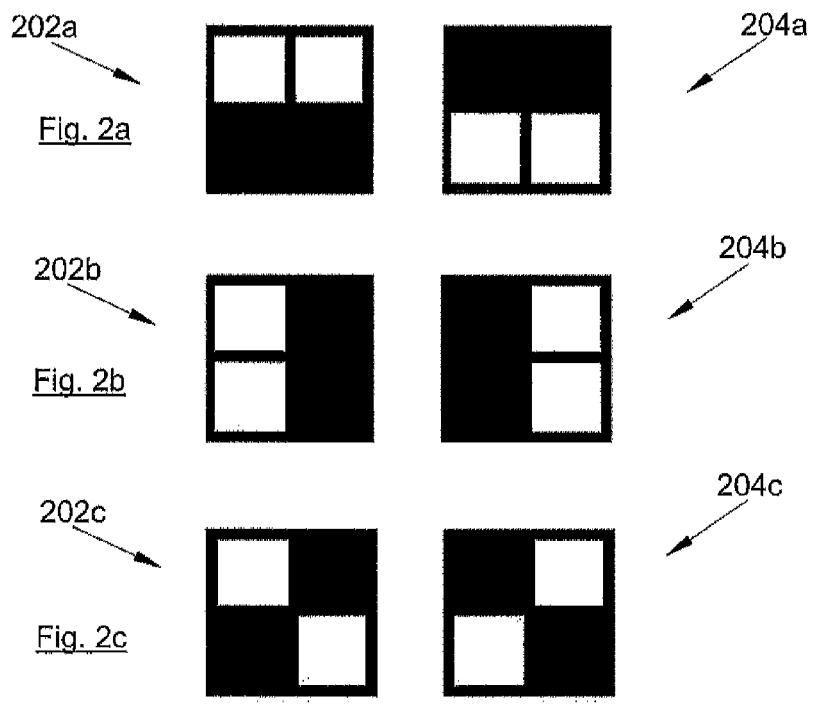
Fig. 2a
Fig. 2b
Fig. 2c
Fig. 4
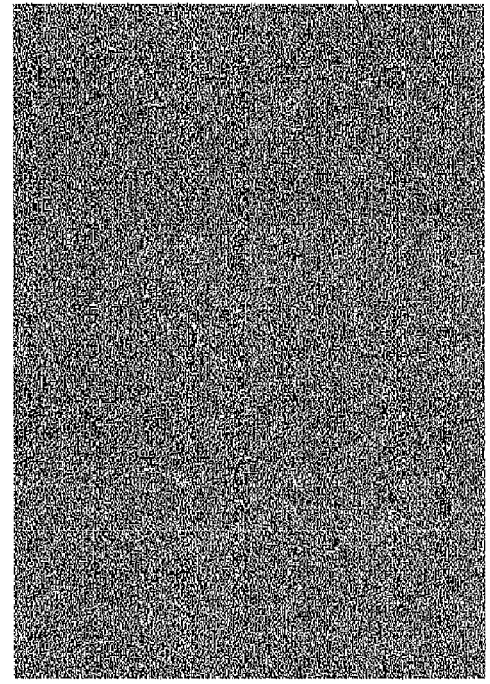
Fig. 5

METHOD OF INDENTIFYING AN INDIVIDUAL

CROSS REFERENCE TO RELATED APPLICATIONS

The present application is based on and claims priority to International Application PCT/EP20071006082 filed on Jul. 9, 2007 French Patent Application No. 06/06290 filed on Jul. 10, 2006, the contents of which are hereby incorporated by reference in their entirety.

BACKGROUND OF THE INVENTION

The present invention concerns a method of identifying an individual by the superimposition of encrypted images, a method of recording, in a database, an image of an item of biometric data, and a device for recording encrypted images using such a recording method and an identification device using such an identification method.

The use of biometric data (fingerprints, iris, etc) makes it possible to protect access to buildings or machines.

For each individual that is to be recognised, a biometric data item must previously be recorded in a reference biometric data base during a recording process.

Next, when the individual wishes to be recognised, an image of his biometric data must be captured and compared with all the reference biometric data in the database during an identification process. If the biometric data thus captured is recognised, the individual is identified as being an authorised person while, if the biometric data thus captured is not recognised, the individual is considered to be an unauthorised person.

The security of the database is very important since a pirate who has access to such database may modify it at the risk of reducing the level of security of the building or machine thus protected.

SUMMARY OF THE INVENTION

One object of the present invention is to propose a method of identifying an individual which does not have the drawbacks of the prior art and which in particular makes it possible to obtain an identification that is easy to achieve while protecting the biometric data.

For this purpose, there is proposed a method of identifying an individual comprising:
  an identification step during which the identity of the individual to be identified is read,
  an obtaining step during which there are obtained a transformation function and an encrypted image previously recorded which corresponds to the said identity read and which was obtained by transformation of the image of a biometric data item of the said individual into at least two encrypted images by the transformation function, the encrypted images being such that visual recognition of the forms of the said biometric data item requires the superimposition of all the encrypted images,
  a capture step during which an image of the biometric data to be identified is captured,
  a transformation step during which the image thus captured is transformed into at least one encrypted image to be identified using the transformation function,
  a superimposition step during which a superimposition image resulting from the superimposition of the encrypted images recorded and the encrypted images to be identified is formed,
  a verification step during which the superimposition image thus formed is verified,
  in the case of positive verification, an identification step during which a decision with regard to the identification of the individual is taken on the basis of the said verification step, and
  in the case of negative verification, a looping-back step.

Advantageously, the obtaining step consists, with regard to the transformation function, of a recovery of the transformation function corresponding to the identity read.

According to a particular embodiment, the looping-back step consists of a substep of enhancing and aligning the encrypted images to be identified with respect to the encrypted images recorded by geometric manipulation of the image of the biometric data item to be identified and a looping-back onto the transformation step.

According to another particular embodiment, the looping-back step consists of a substep of displaying the superimposition image and a looping-back of the process to the capture step.

Advantageously, the verification step consists of an analysis of the sharpness of the superimposition image.

Advantageously, prior to the transformation step, the image of the biometric data item is transformed into its direction matrix.

The invention also proposes a method of recording an image in a database comprising:
  a step of capturing an image of a biometric data item,
  a step of obtaining a transformation function,
  a step of transforming the image of the biometric data item into at least two encrypted images by the transformation function, the encrypted images being such that the visual recognition of the forms of the said biometric data requires the superimposition of all the encrypted images, and
  a step of saving, in the database, only some of the images thus encrypted.

Advantageously, the transformation function is generated for each biometric data item and the saving step includes the saving of the transformation function.

Advantageously, the transformation function is based on a visual cryptography method.

Advantageously, prior to the step of transforming the image of the biometric data item, the image of the biometric data item is transformed into its direction matrix.

The invention also proposes a device for recording encrypted images that comprises means for implementing a recording method according to the one of the preceding variants.

The invention also proposes an identification device that comprises means for implementing an identification method according to one of the preceding variants.

The remainder of the description is particularly described with reference to fingerprints but can apply in the same way to all types of biometric data such as an iris or others.

The characteristics of the invention mentioned above, as well as others, will emerge more clearly from a reading of the following description of an example embodiment, the said description being given in relation to the accompanying drawings, among which:

BRIEF DESCRIPTION OF THE DRAWINGS

FIG. 2a, FIG. 2b and FIG. 2c depict examples of subdivisions of pixels used in the context of the invention,
FIG. 4 depicts a first fingerprint that is to be identified,
FIG. 5 depicts an encrypted image of the first fingerprint obtained by the first embodiment of the invention.

FIG. 1 depicts an image 100 of a fingerprint captured by means of a fingerprint sensor. This fingerprint image 100 is in black and white and, in the remainder of the description, is considered to be the image of the reference print 100.

FIG. 13 depicts a device for recording encrypted images 1300 that comprises such a fingerprint sensor 1302. The recording device 1300 comprises a database 1314 in which there are stored encrypted images of reference prints, the generation of which is described below. An individual wishing to record one of the encrypted images issuing from his fingerprint in the database 1314 places his finger 1304 on the fingerprint sensor 1302, which captures the image of the reference print 100.

DETAILED DESCRIPTION OF ILLUSTRATIVE EMBODIMENTS

Figure 1:
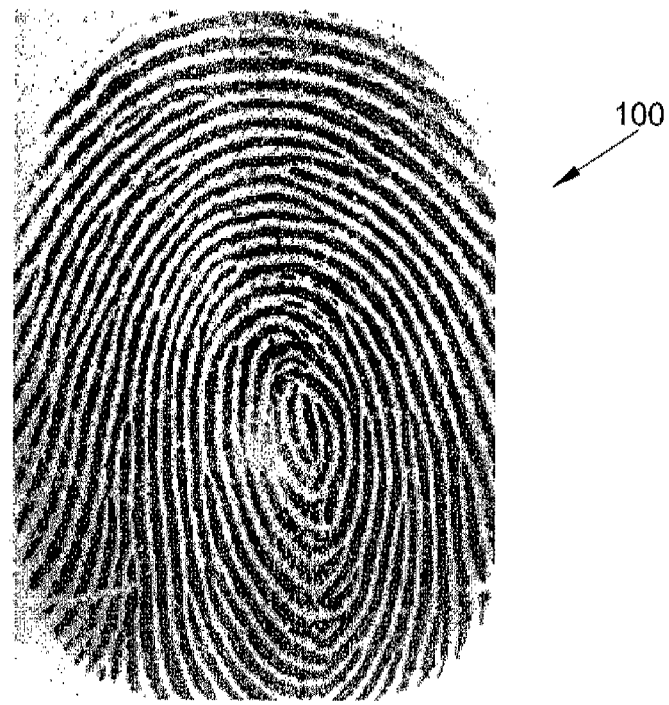
FIG. 1 depicts an image of a reference fingerprint.

The image of the reference print 100 is then transformed so as to obtain two encrypted images that are such that, when at least one of these two encrypted images is not known, it is not possible to reconstitute the image of the reference print 100. In other words, in order to visually recognise the forms of the reference print 100 as they appear on the image of the reference print 100, it is necessary to superimpose the two encrypted images that issue from the transformation. If one of the encrypted images is missing, it is not possible to determine the global information relating to the image of the reference print 100.

The method used for transforming the image of the reference fingerprint 100 into two encrypted images preferably consists of the so-called "visual cryptography" method, which makes it possible to encrypt visual information.

The image of the reference print 100 is an image consisting of black and white pixels. The transformation into two encrypted images thus consists of producing two images which, by superimposition and transparency, make it possible to obtain an image that is comparable to that of the reference print 100.

According to a particular embodiment of the invention, each pixel of the image of the reference print 100 is subdivided into groups of several sub-pixels, preferably four forming a square.

FIG. 2a, FIG. 2b and FIG. 2c depict examples of subdivisions of pixels into four sub-pixels. Each sub-pixel can be opaque (black in the figs) or transparent (white in the figs). Each group of four sub-pixels 202a, 204a, 202b, 204b, 202c and 204c consists of two opaque sub-pixels and two transparent sub-pixels.

FIG. 2a depicts a horizontal subdivision. Each group of sub-pixels 202a, 204a is symmetrical to the other 204a, 202a through symmetry with respect to a horizontal line. The first group of sub-pixels 202a comprises two transparent sub-pixels disposed horizontally alongside each other and two opaque sub-pixels disposed horizontally alongside each other and below the two transparent pixels. The second group of sub-pixels 204a is derived from the first group by axial symmetry of horizontal axis.

FIG. 2b depicts a vertical subdivision. Each group of sub-pixels 202b, 204b is symmetrical with the other 204b, 202b by symmetry with respect to a vertical line. The first group of sub-pixels 202b comprises two transparent sub-pixels disposed vertically one above the other and two opaque sub-pixels disposed vertically one above the other and to the right of the two transparent sub-pixels. The second group of sub-pixels 204b is derived from the first group by axial symmetry of vertical axis.

FIG. 2c depicts a diagonal subdivision. The first group of four sub-pixels 202c comprises two transparent sub-pixels disposed diagonally with respect to each other and two opaque sub-pixels disposed diagonally with respect to each other. The second group of four sub-pixels 204c has diagonals reversed with respect to the first group of four pixels 202c, that is to say it is derived from the first group by an axial symmetry of vertical or horizontal axis.

The transformation of the image of the reference print 100 into two encrypted images is effected according to the following principle.

When the pixel of the image of the reference print 100 is black, the group of six sub-pixels of the first encrypted image and the group of sub-pixels of the second encrypted image are different. For example, in the case of a horizontal subdivision, the first encrypted image receives the first group of four sub-pixels 202a and the second encrypted image receives the second group of four sub-pixels 204a, or vice versa.

When the pixel of the image of the reference print 100 is white, the group of sub-pixels of the first encrypted image and the group of sub-pixels of the second encrypted image are identical. For example, in the case of a horizontal subdivision, the first encrypted image and the second encrypted image receive the first group of four sub-pixels 202a or the second group of four sub-pixels 204a.

The superimposition of the two encrypted images then makes it possible to find, for each black pixel of the image of the reference print 100, a black pixel consisting of four opaque sub-pixels and, for each white pixel of the image of the reference print 100, a grey pixel consisting of two opaque sub-pixels and two transparent sub-pixels.

The superimposition operation thus corresponds to an OR according to the following rules as a function of the colour of each sub-pixel superimposed on another sub-pixel:

transparent OR transparent=transparent,
opaque OR transparent=opaque,
transparent OR opaque=opaque, and
opaque OR opaque=opaque.

Each encrypted image is therefore determined by taking the first pixel of the image of the reference print 100, choosing a subdivision (horizontal, vertical, diagonal or other), choosing a pair of groups of sub-pixels, choosing which group of sub-pixels is attributed to which encrypted image according to the colour, black or white, of the pixel of the image of the reference print 100.

In order to clarify the method of determining each encrypted image, an example is detailed here.

The image of the reference print 100 has four pixels distributed according to the series black-white-white-black. Only the horizontal subdivision is used.

For the first black pixel, the pair (202a, 204a) is chosen and the first encrypted image receives the group 202a and the second encrypted image receives the group 204a.

For the first white pixel, the pair (202a, 204a) is chosen and each encrypted image receives the group 202a.

For the second white pixel, the pair (204a, 202a) is chosen and each encrypted image receives the group 204a.

For the second black pixel, the pair (204a, 202a) is chosen and the first encrypted image receives the group 204a and the second encrypted image receives the group 202a.

In this example, only the horizontal subdivision is used, but it is possible to change subdivision for each pixel of the image of the reference print 100.

The transformation of the image of the reference print 100 into two encrypted images therefore takes place through a transformation function Γ which, for each pixel of the image of the reference print 100, stores the pair of groups of sub-pixels used (namely (202a, 294a) or (204a, 202a)). Next, the first encrypted image receives the first group of sub-pixels 202a (or 204a) and the second encrypted image receives the second group of sub-pixels, which is determined from the black or white colour of the pixel of the image of the reference print 100.

Figures 3A, 3B:
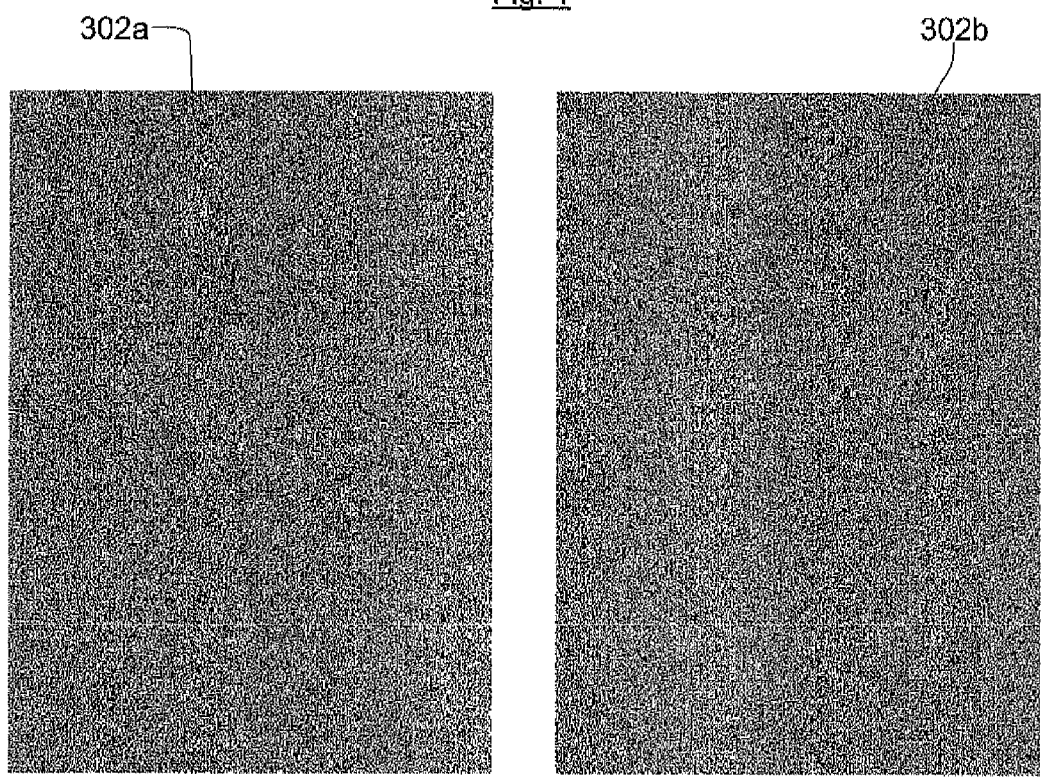
FIG. 3a and FIG. 3b depict encrypted images of the reference fingerprint obtained by a first embodiment of the invention.

FIG. 3a shows the first encrypted image 302a from the image of the reference print 100 of FIG. 1 and transformation function Γ as just described.

FIG. 3b depicts the first encrypted image 302b from the image of the reference print 100 of FIG. 1 and the same transformation function Γ.

Individually, each encrypted image 302a, 302b gives no information on the image of the reference print 100a but the superimposition of the two encrypted images 302a and 302b give a print image in accordance with that of FIG. 1 but on a grey background instead of white.

Figure 13:
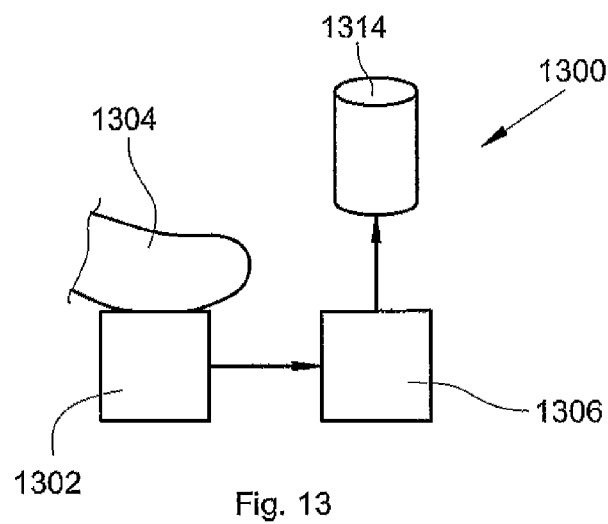
FIG. 13 is a schematic representation of a device for recording encrypted images.

In order to effect the transformation of the image of the reference print 100 into two encrypted images 302a and 302b, the encrypted image recording device 1300 comprises a transformation module 1306 (see FIG. 13). The transformation module 1306 is designed to generate the two encrypted images 302a and 302b from a transformation function Γ that is established in advance for all the individuals or for each individual or which the transformation module 1306 establishes itself for each individual.

One of the encrypted images 302a or 302b is then saved in a database 1314. If the transformation function Γ varies according to the individuals, it must also be saved in the database 1314.

The method of recording an image in the database 1314 comprises:
 a step of capturing the image of the print 100,
 a step of obtaining the transformation function Γ,
 a step of transforming the image of the print 100 into two encrypted images 302a and 302b by the transformation function Γ, the two encrypted images 302a and 302b being such that the visual recognition of the forms of the said print requires the superimposition of the two encrypted images 302a and 302b, and
 a step of saving, in the database 1314, only one of the two images thus encrypted 302a, 302b.

The advantage of this method is allowing the production of a secure database through the fact that an intrusion within this database 1314 does not make it possible to obtain global information on the forms of the prints that were used to produce these encrypted images 302a, 302b. This is because intruder can have access to only one of the two reference encrypted images 302a or 302b.

This recording method applies in the same way to other biometric data such as for example the iris.

If the transformation function Γ is generated individually, that is to say for each print, the saving step includes the saving of the transformation function Γ.

The transformation function Γ can be generated globally for all individuals, and the generation step is then replaced by a step of recovering the transformation Γ from a module generating the transformation function Γ.

Figure 14:
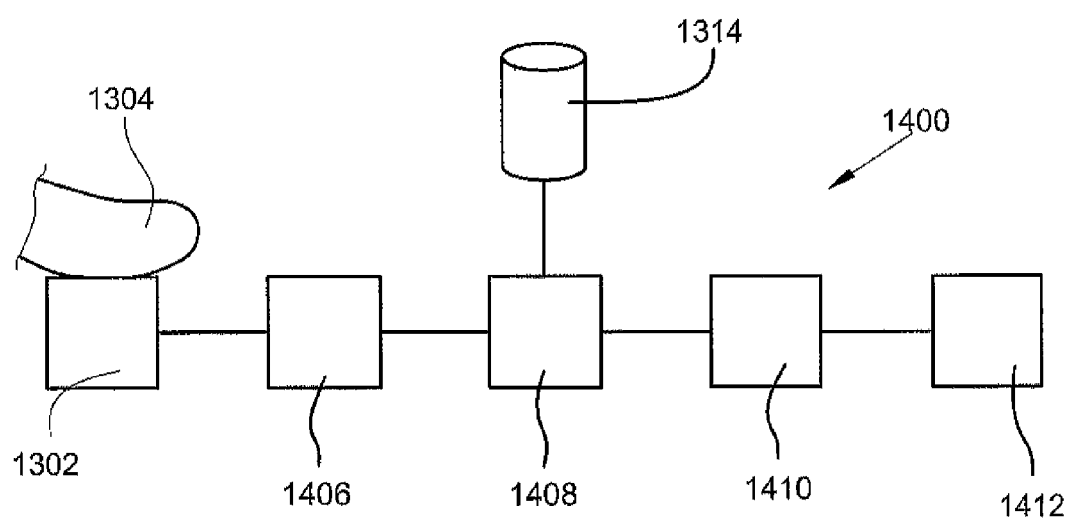
FIG. 14 is a schematic representation of an identification device according to the invention.

FIG. 14 shows an identification device 1400 that is connected to the database 1314. In order to ensure confidentiality of the data in the database 1314 and prevent an intrusion into this database 1314 giving the intruder information on the images of reference prints, the database 1314 contains, for each individual, only one of the two encrypted images generated previously, as well as the transformation function Γ if this is dependent on the individual. This separation of the database is particularly advantageous in the case of a remote database 1314 receiving information from a central database containing the two reference encrypted images 302a and 302b. This is because only some of the information relating to the image of the reference grid 100 is present and this information cannot be used.

In the remainder of the description, the encrypted image that is stored in the database 1314 is referred to as the reference encrypted image.

The identification device 1400 comprises a fingerprint sensor 1302. An individual who wishes to be identified places his finger 1304 on the fingerprint sensor 1302, which captures the image of his fingerprint.

FIG. 4 shows the image of such a fingerprint 14.

FIG. 5 shows an encrypted image 500 generated from the image of the fingerprint 400 to be identified and the transformation function Γ. This encrypted image is referred as the encrypted image to be identified 500.

In fact, if the reference encrypted image corresponds to the first (or respectively second) encrypted image 302a (or respectively 302b) generated by the transformation function Γ, the encrypted image to be identified 500 corresponds to the second (or respectively first) encrypted image generated from the image of the print to be identified 400 and the transformation function Γ.

In order to determine whether or not the individual to be identified is an authorised person, the reference encrypted image and the encrypted image to be identified 500 are superimposed and the analysis then relates to the result of this superimposition. The identification is then easy to carry out since an analysis of the sharpness of the superimposition image is sufficient and because of the particular structure of the encrypted images, the biometric data are secure.

Figure 6C:
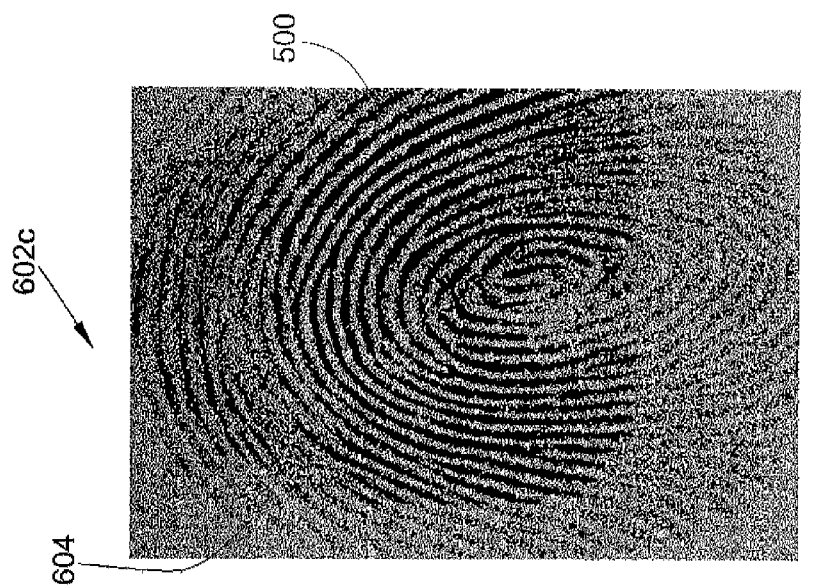
FIG. 6a, FIG. 6b and FIG. 6c depict, in the context of the first embodiment of the invention, the images obtained by superimposition of the encrypted image of the reference fingerprint and of the encrypted image of the first fingerprint.
Figure 6B:
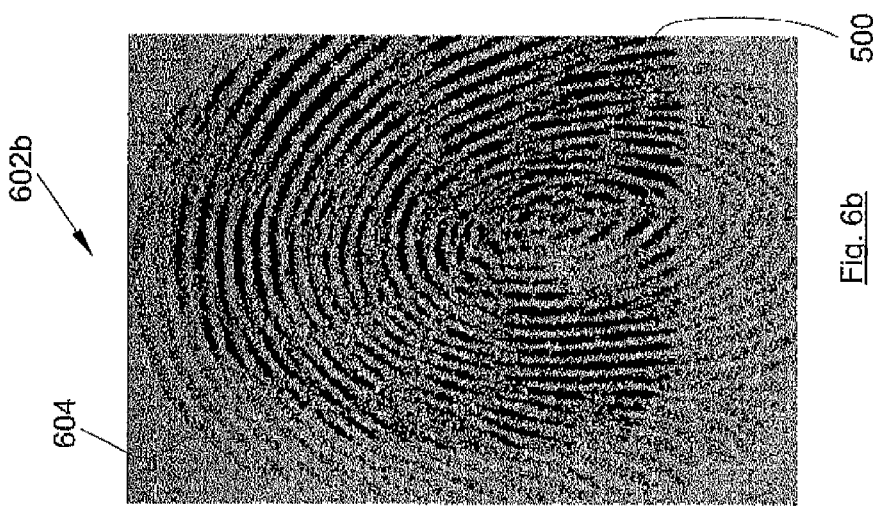
Figure 6A:
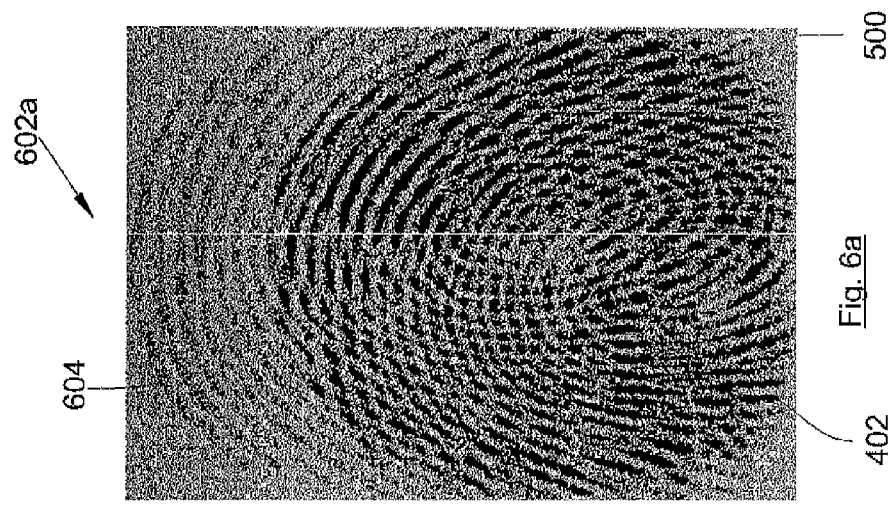

FIG. 6a, FIG. 6b and FIG. 6c depict three superimpositions of the reference encrypted image and the encrypted image to be identified 500.

FIG. 6a shows a superimposition image 602a consisting of the reference encrypted image 604 and the encrypted image to be identified 500. Because of the offset of the image of the print to be identified 400 with respect to the image of the reference print 100, the superimposition image 602*a* is fuzzy and the individual to be identified cannot therefore be recognised.

On the other hand, the superimposition image 602*a* shows that the reference encrypted image 604 and the encrypted image to be identified 500 are offset with respect to each other. It is then possible for the individual to be identified, by displaying the superimposition image 602*a*, to move the finger 1304 so that the encrypted image to be identified 500 is superimposed correctly with the reference encrypted image 604.

FIG. 6*b* shows a superimposition image 602*b* whose superimposition is improved compared with the superimposition image 602*a*, but there remain fuzzy zones and the individual cannot be considered to have been recognised.

FIG. 6*c* shows a superimposition image 602*c* whose superimposition is perfect and there no longer remain any fuzzy zones and the individual can be considered to have been recognised.

The sharpness of the superimposition is verified by the sharpness of the opaque forms that appear and that vary according to the alignment of the encrypted image to be identified 500 with the reference encrypted image 604. This alignment can be achieved manually or automatically.

Manual alignment can be achieved by a controller who knows the identity of the individual to be identified and who can manipulate the encrypted image to be identified 500 in order to make it coincide with the reference encrypted image 604 corresponding to this individual.

Manual alignment can be achieved by the individual to be identified himself, who identifies himself with the encrypted image alignment device 1400 so that the latter displays the corresponding reference encrypted image 604. Display of the superimposition images enables the individual to be identified to correctly position his finger 1304 in order to make the encrypted image to be identified 500 coincide with the reference encrypted image 604. Validation of identification can be done by a controller displaying the final superimposition image or by an automatic system that measures the sharpness of the final superimposition image.

In the context of an automatic alignment by an automatic system, the individual to be identified identifies himself with the encrypted image alignment device 1400 so that the latter recovers the corresponding reference encrypted image 604. The automatic system then attempts to align the encrypted image to be identified 500 with the reference encrypted image 604 by manipulation of the encrypted image to be identified 500.

Non-alignment of the encrypted image to be identified 500 and the reference encrypted image 604 generally results from faulty positioning of the finger 1304 on the fingerprint sensor 1302 and/or a pressure of the finger 1304 on the fingerprint sensor 1302 different from that which was exerted during the recording of the reference encrypted image 604.

Faulty positioning of the finger 1304 can be resolved by translations and rotations of the finger 1304 or of the encrypted image to be identified. A different pressure can be resolved by a different pressure of the finger 1304 or by a homothetic transformation of the encrypted image to be identified. The centre of the homothetic transformation is situated close to the centre of the print, namely the reference point 402 in FIG. 4. By analysing the superimposition image, it is possible to locate the centre of the homothetic transformation 402 approximately.

Figure 7:
FIG. 7 depicts a second fingerprint that is to be identified.

FIG. 7 shows the image 700 of a fingerprint that is different from the reference fingerprint.

In the same way as before, the image of the print to be identified 700 is transformed into two encrypted images to be identified, including the encrypted image referenced 802.

Figures 8A, 8B:
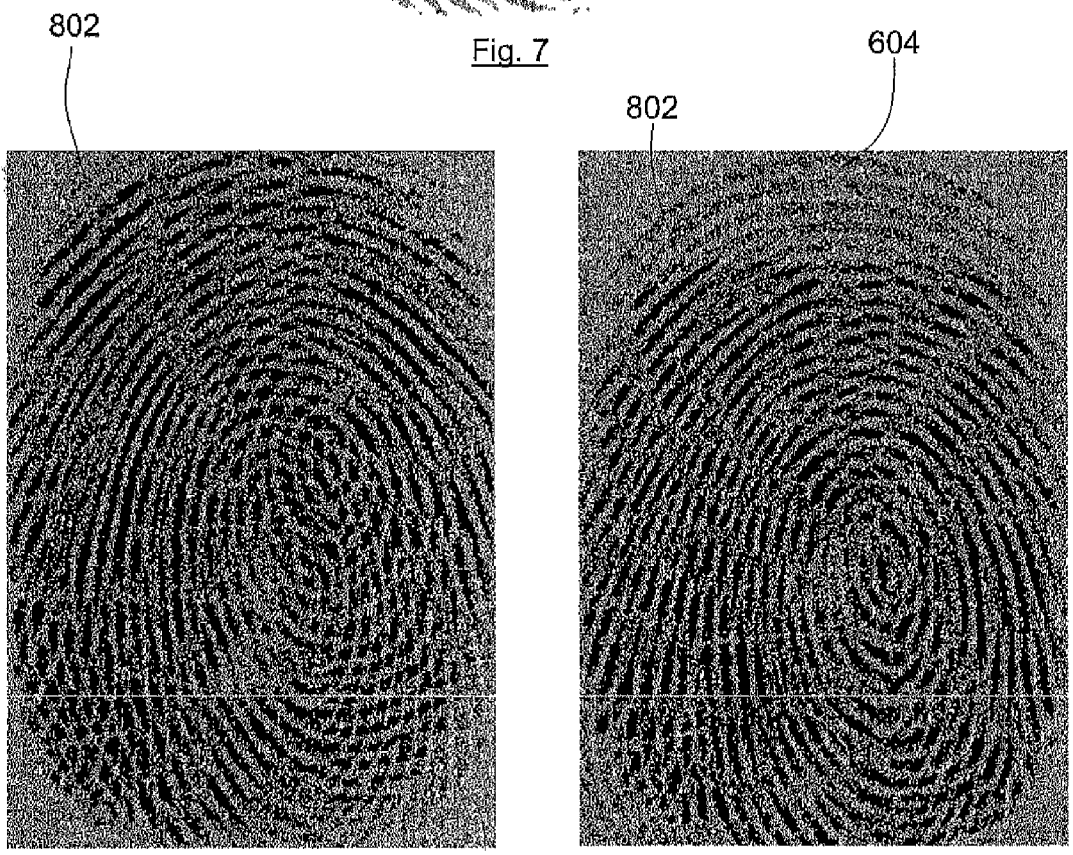
FIG. 8a and FIG. 8b depict, in the context of the first embodiment of the invention, the images obtained by superimposition of the encrypted image of the reference fingerprint and of the encrypted image of the second fingerprint.

FIG. 7*a* and FIG. 7*b* show two superimpositions of the reference encrypted image 604 and the encrypted image to be identified 802. Each of these superimposition images has fuzzy zones even after translation and alignment of the central zones of the prints (FIG. 8*b*).

The individual possessing the print corresponding to the image 700 cannot therefore be validly recognised as an authorised person.

Figure 12:
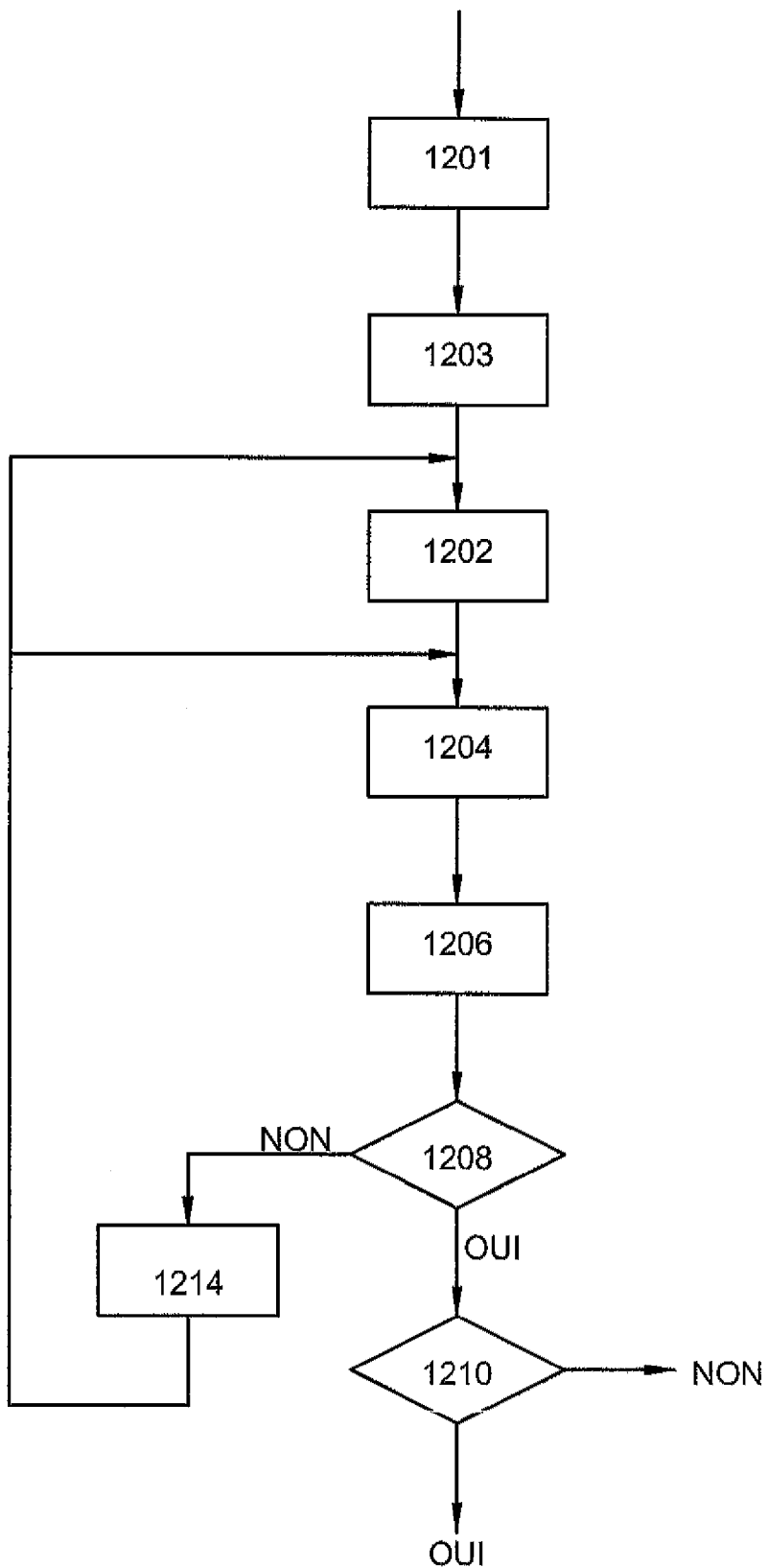
FIG. 12 depicts an algorithm of an identification method according to the invention.

FIG. 12 shows an algorithm of the method of identifying and individual whose reference encrypted image 302*a* or 302*b* has been recorded according to the recording method described above.

The identification method comprises:
an identification step 1201 during which the identity of the individual to be identified is read,
an obtaining step 1203 during which there are obtained the transformation function $\Gamma$ and the previously recorded encrypted image 302*a*, 302*b* that corresponds to the said identity read and that was obtained by transformation of the image of a biometric data item 100 of the individual into at least two encrypted images 302*a*, 302*b* by the transformation function $\Gamma$, the encrypted images 302*a*, 302*b* being such that visual recognition of the forms of the said biometric data requires the superimposition of all the encrypted images 302*a*, 302*b*,
a capture step 1202 during which the image of the print to be identified 400, 700 is captured,
a transformation step 1204 during which the image thus captured is transformed into an encrypted image to be identified 500, 802 from the transformation function $\Gamma$,
a superimposition step 1206 during which a superimposition image resulting from the superimposition of the recorded encrypted image 302*a*, 302*b* and the encrypted image to be identified 500, 802 is formed,
a verification step 1208 during which the superimposition image thus formed is verified,
in the case of positive verification, an identification step 1210 during which a decision with regard to the identification of the individual is taken on the basis of the said verification step 1208, and
in the case of negative verification, a looping-back step 1214.

This identification method allows verification of the identity of an individual by visual alignment of two encrypted images that are such that knowledge of only one of these two images does not make it possible to obtain information on the biometric data in question, thus affording increased security in the case of intrusion into the database.

When the verification step 1208 is carried out manually by a controller or automatically on one of the reference encrypted images 302*a*, 302*b* in the database 1314, the looping-back step 1214 consists of a substep of improving the alignment of the encrypted image to be identified 500, 802 with respect to the reference encrypted image 302*a*, 302*b* by geometric manipulation (translation, rotation, homothetic transformation) of the image of the print to be identified 400, 700 and a looping back of the process onto the transformation step 1204. This is because the transformation of the image of the print to be identified 400, 700 depends on the position of the finger 1304 (the transformation function $\Gamma$ applies differently according to the position of the pixel to which it applies).

When the verification step 1208 is performed manually by the individual to be identified himself, the looping-back step 1214 consists of a substep of displaying the superimposition image and a looping back of the process onto the capture step 1202. This is because, after the display of the superimposition image, the individual is in a position to deduce therefrom the new position of the finger 1304 and/or the new pressure to be exerted on the fingerprint sensor 1302. The individual then modifies the position of his finger 1304 and/or the pressure that be is exerting before the new capture step 1202.

The identification step 1201 can comprise, for example, a phase of entering a code or reading a chip card, making it possible to identify the individual wishing to be identified.

When the transformation function Γ is global for all the individuals, the obtaining step 1203 can consist, with regard to the transformation function Γ, of a reading of an internal memory of the identification device 1400 or a recovery from the database 1314.

When the function of the transformation Γ is individual, the obtaining step 1203 consists, with regard to the transformation function Γ of a recovery, from the database 1314, of the transformation function Γ corresponding to the identity read.

The verification step 1208 can consist of an analysis of the sharpness of the superimposition image. The verification is said to be positive when the sharpness achieved is the best possible. For example, the process verifies the sharpness by iteration, that is to say the sharpness of each superimposition image is analysed with respect to the superimposition that was previously analysed as having the best sharpness. Thus, when the best sharpness is achieved, the process passes to the identification step 1210.

To analyse the sharpness of the superimposition image, it is possible to use a known method of analysing the sharpness of an image. For example, it is possible to consider a part of the superimposition image, to effect a translation of one of the two encrypted images with a relatively coarse step and to check whether the same part of the resulting superimposition image is more or less fuzzy. If the resulting superimposition image is more fuzzy, the translation is cancelled and a translation is carried out in another direction. If the resulting superimposition image is less fuzzy, this new base is started from again and the process is recommenced, refining the step gradually in different directions in order to find the best position. The fuzzier the analysed part, the closer the signal level of a pixel is to the signal level of its neighbours, while, when the analysed part is sharp, the signal level of a pixel is very different from the signal level of some of its neighbours. In other words, when the image is sharp, a white pixel and a black pixel are adjacent, while when the image is fizzy the two pixels are more or less grey.

It is also possible to use the conventional Laplacian method for determining the sharpness of the superimposition image. Analysis of the sharpness then consists of the following steps for two encrypted images:
   an offsetting step between the two encrypted images,
   a step during which the Laplacian is applied by convolution for the resulting superimposition image,
   a step of looping back onto the offsetting step with a different offset as long as not all possible offsets have been effected,
   a step of comparing the norms of the matrices obtained, and
   a step of preserving the offset that made it possible to obtain the smallest norm.

The identification step 1210 can base its decision on the sharpness that is obtained at the output from the verification step 1208. If the sharpness of the final superimposition image is above a certain threshold, the individual to be identified is recognised as being an authorised person; in the contrary case the individual is recognised as not being an authorised person.

During the transformation step 1204, the image of the print to be identified 400, 700 is transformed into two encrypted images to be identified 500, 802 on the basis of the transformation function Γ.

The transformation is effected in the following way.

The first pixel (referred to as the first pixel to be identified) of the image of the print to be identified 400, 700 is selected, as well as the pair of sub-pixel groups used (namely (202a, 204a) or (204a, 202a)) for the transformation function Γ on the first pixel of the image of the reference print 100. If the first pixel to be identified is white, the first encrypted image to be identified receives the first group of sub-pixels 202a (or respectively 204a) and the second encrypted image to be identified receives the first group of sub-pixels 202a (or respectively 204a). If the first pixel to be identified is black, the first encrypted image to be identified receives the first group of sub-pixels 202a (or respectively 204a) and the second encrypted image to be identified receives the second group of sub-pixels 204a (or respectively 202a).

In order to allow the implementation of the identification method, the identification device 1400 comprises:
   a transformation module 1406 designed to transform the captured image into an encrypted image to be identified 500, 802 from the transformation function Γ,
   a superimposition module 1408 designed to recover the recorded encrypted image 302a, 302b from the database 1314 and to superimpose it on the encrypted image to be identified 500, 802 in order to form the superimposition image,
   a verification module 1410 provided for verifying the superimposition image formed, and
   an identification module 1412 provided for making a decision with regard to the identification of the individual.

According to another embodiment of the invention, the image of the biometric data captured undergoes a first transformation prior to the step of transformation of the image of the biometric data into two encrypted images, both in the recording process and in the identification process.

The first transformation consists of converting the image of the biometric data into its direction matrix. The direction matrix of a fingerprint is a matrix representing the local orientation of the peak lines of the print in a given number of points of the image of the print. A graphical representation can then be obtained by attributing a grey level to each possible orientation. The image is then represented in grey levels rather than in black and white.

Figure 9C:
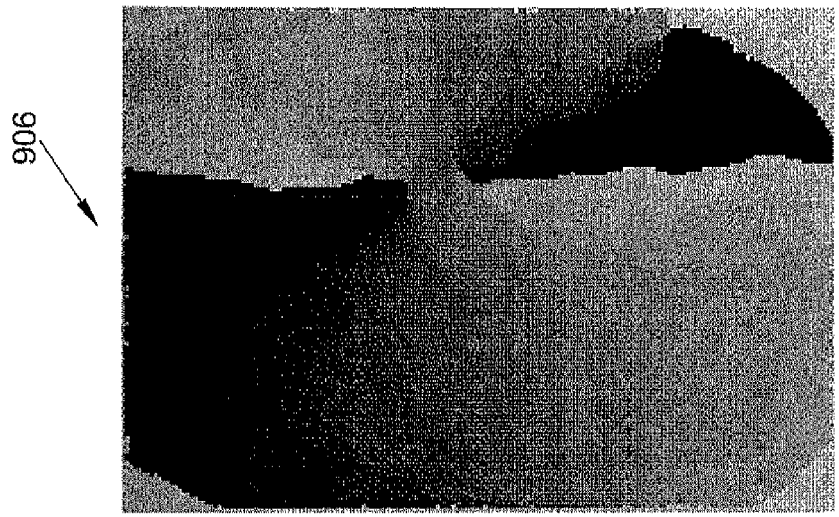
FIG. 9a, FIG. 9b and FIG. 9c depict encrypted images of fingerprints obtained by a second embodiment of the invention.
Figure 9B:
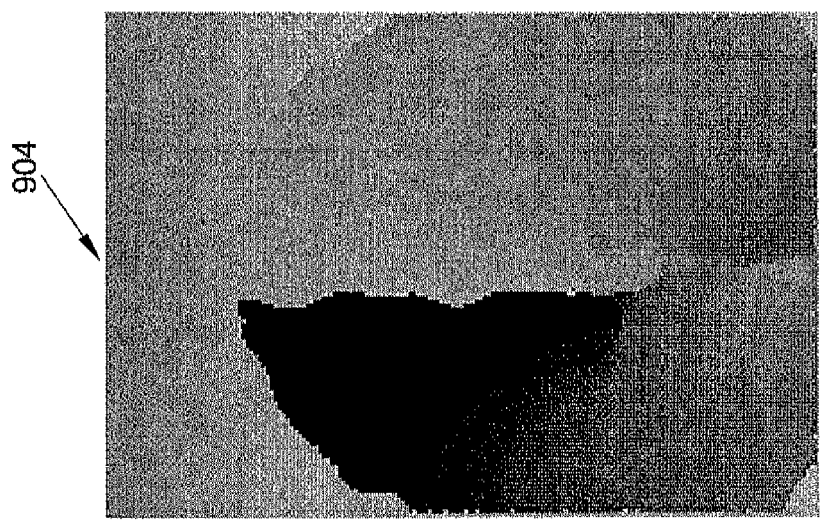
Figure 9A:
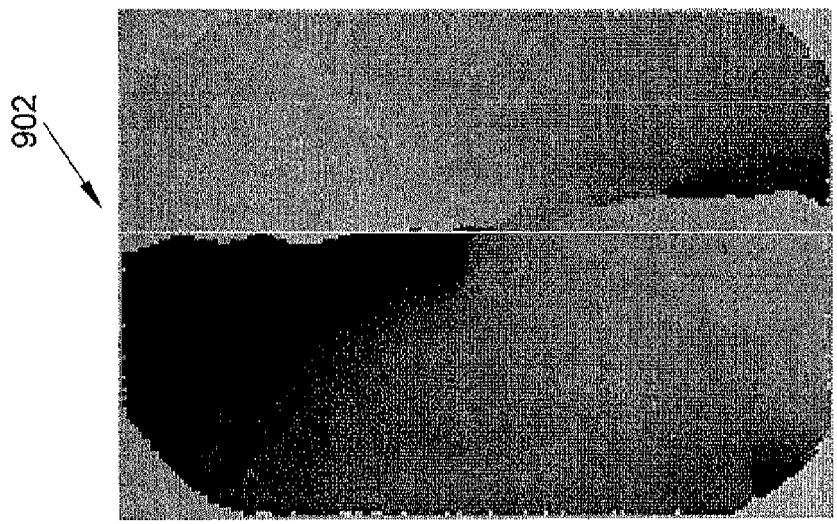

FIG. 9a depicts the direction matrix 902 of the reference print 100 of FIG. 1.

FIG. 9b depicts the direction matrix 904 of the print to be identified 400 of FIG. 4.

FIG. 9c depicts the direction matrix 906 of the print to be identified 700 of FIG. 7.

The dark zones represent the points where the directions of the tangents at these points have a positive angle in the trigonometric direction. Between a dark zone and a light zone, the angle of the tangents varies from 0 to π.

The step of transformation of the image into two encrypted images then applies to the biometric data image in the form of its direction matrix.

Figure 10C:
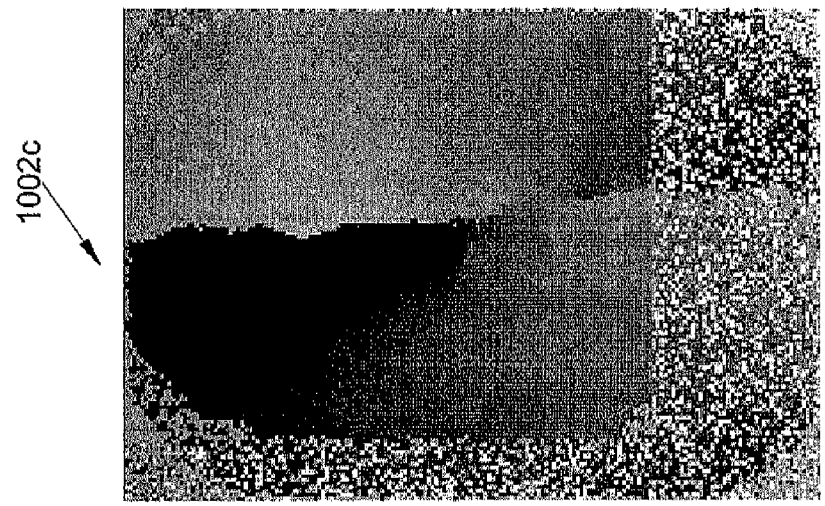
FIG. 10a, FIG. 10b, FIG. 10c, FIG. 11a and FIG. 11b depict, in the context of the second embodiment of the invention, the images obtained by superimposition of the encrypted image of a reference fingerprint and of the encrypted image of fingerprints that are to be identified.
Figure 10B:
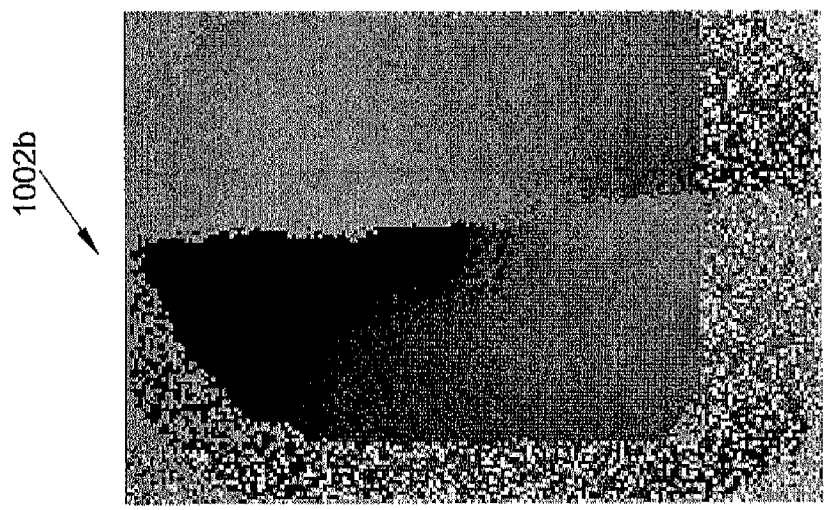
Figure 10A:
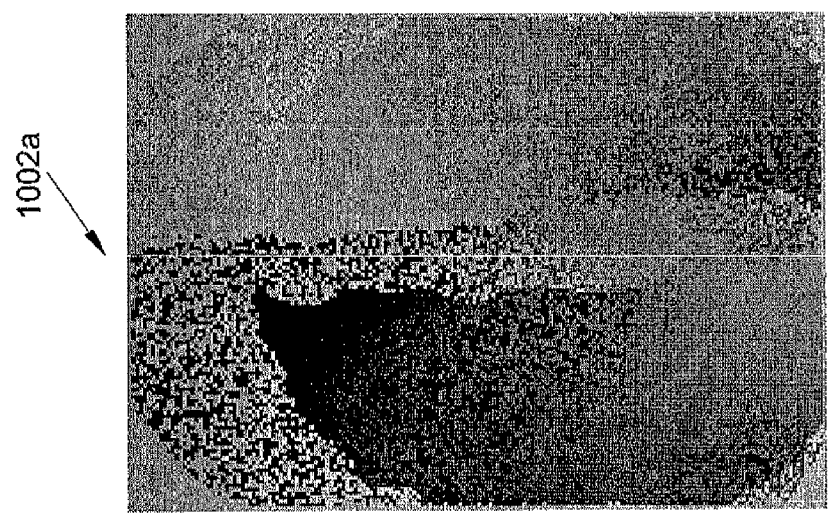

FIG. 10a, FIG. 10b and FIG. 10c depict the superimposition images 1002a, 1002b and 1002c obtained by superimposition of the encrypted image of the direction matrix 902 of the reference print and the encrypted image of the direction matrix 904 of the print to be identified 400, that is to say when the print to be verified corresponds to the reference print.

FIGS. 10a, 10b and 10c correspond respectively to the positions of FIGS. 6a, 6b and 6c, that is to say when the alignment of the two images is poor, then when it is improved, and then when it is perfect.

It will be noted that in FIG. 10 there exist large parasitic zones that become blurred in FIG. 10c.

Figure 11B:
Figure 11A:
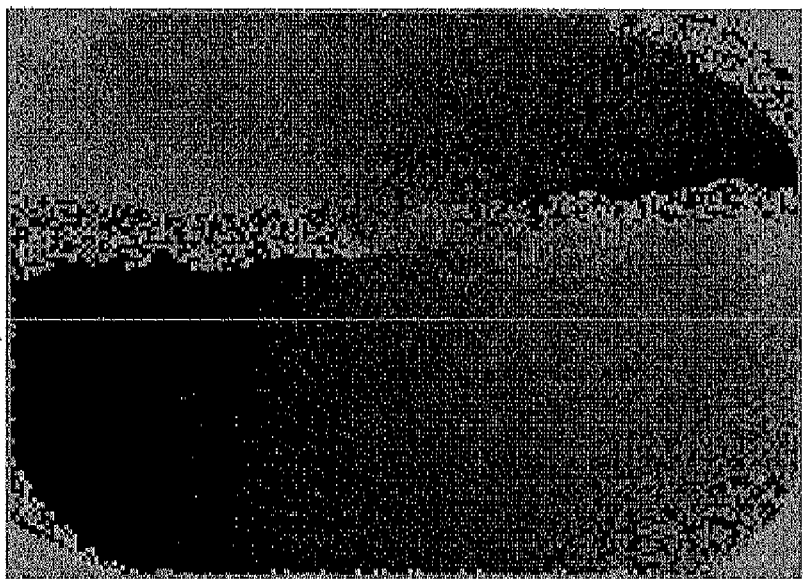

FIG. 11a and FIG. 11b depict the superimposition images 1102a and 1102b obtained by superimposition of the encrypted image of the direction matrix 902 of the reference print and the encrypted image of the direction matrix 906 of the print to be identified 700, that is to say when the print to be verified does not correspond to the reference print.

FIGS. 11a and 11b correspond respectively to the positions in FIGS. 8a and 8b, that is to say when the alignment of the two images is poor, and then when it is improved but not matching.

It will be noted that, in FIG. 11a, there exist large parasitic zones that become partially blurred in FIG. 11b but not at the centre of the image.

The step of transforming the image of the biometric data into two encrypted images has been particularly described in the context of an OR function but can also be based on an XOR function associated with a mask, which also constitutes a visual cryptography method.

Each image of a captured biometric data item is divided into two intermediate images. Each of these intermediate images is then combined with the mask through an XOR function. The result of each combination produces an encrypted image that can be used in the remainder of the recording process or of the identification process.

The transformation function Γ is then the combination of this division into two intermediate images and the application of the XOR function.

The intermediate images can for example consist respectively of even pixels and odd pixels of the image of the biometric data captured.

Naturally the present invention is not limited to the examples and embodiments described and depicted but is capable of numerous variants accessible to persons skilled in the art.

The invention has been more particularly described in the case where the image of the biometric data is transformed into two encrypted images but applies in the same way if the image of the biometric data is transformed into more than two encrypted images.

The step of transformation of the image of the print 100 into two encrypted images by the transformation function Γ must then be understood as a step of transformation of the image of the biometric data 100 into at least two encrypted images by the transformation function Γ, the encrypted images being such that the visual recognition of the forms of the said biometric data requires the superimposition of all the encrypted images.

The step of saving in the database 1314 is then understood as a step of saving in the database 1314 only some of the images thus encrypted.

In the same way, the identification method applies when at least one encrypted image of the biometric data has been recorded according to the recording method described above. The transformation step 1204 is then understood as the transformation of the captured image into at least one encrypted image to be identified from the transformation function Γ. The superimposition step 1206 is then understood as a superimposition step during which a superimposition image resulting from the superimposition of the encrypted images recorded and the encrypted images to be identified is formed.

The looping step 1214 consisting of a substep of improving the alignment of the encrypted image to be identified 500, 802 with respect to the recorded encrypted image 302a, 302b by manipulation of the image of the biometric data to be identified, is understood as a looping step consisting of a substep of improving the alignment of the encrypted images to be identified with respect to the encrypted images recorded by manipulation of the image of the biometric data to be identified.

The invention has been described in particular in the case of a black and white captured image but can apply in the same way to a grey-level image as applied in the case of the direction matrix.

The invention claimed is:

1. A method of identifying an individual comprising successively:
   a) an identification step (1201) during which the identity of the individual to be identified is read;
   b) an obtaining step (1203) during which there are obtained a transformation function (Γ) and an encrypted image (302a, 302b) previously recorded which corresponds to the said identity read and which was obtained by transformation of an image of a biometric data item (100) of the said individual into at least two encrypted images (302a, 302b) by the transformation function (Γ), the encrypted images (302a, 302b) being such that visual recognition of the forms of the said biometric data item requires the superimposition of all the encrypted images (302a, 302b);
   c) a capture step (1202) during which another image of the biometric data (400, 700) to be identified is captured;
   d) a transformation step (1204) during which the other image thus captured is transformed into at least one encrypted image to be identified (500, 802) using the transformation function (Γ);
   e) a superimposition step (1206) during which a superimposition image resulting from the superimposition of the encrypted image/images (302a, 302b) recorded and the encrypted image/images to be identified (500, 802) is formed; and
   f) a verification step (1208) during which the superimposition image thus formed is verified;
      i) in the case of positive verification, an identification step (1210) during which a decision with regard to the identification of the individual is taken on the basis of the said verification step (1208); and
      ii) in the case of negative verification, a step of improving the alignment of the encrypted image/images recorded (302a, 302b) with respect to the encrypted image/images to be identified (500, 802) and a looping back step (1214).

2. The identification method of claim 1, wherein the obtaining step (1203) consists, with regard to the transformation function (Γ), of a recovering of the transformation function (Γ) corresponding to the identity read.

3. The identification method of claim 1, wherein the verification step (1208) consists of an analysis of the sharpness of the superimposition image.

4. The identification method of claim 1, wherein, prior to the transformation step (1204), the image of the biometric data is transformed into its direction matrix.

5. The identification device (1400), characterised in that it comprises means for implementing the identification method claim 1.

6. The identification method of claim 1, wherein the step of improving the alignment consists of a step of displaying the superimposition image and wherein the looping back step (1214) consists of a looping back of the process onto the capture step (1202).

7. The identification method of claim 1, wherein the step of improving the alignment consists of a geometric manipulation of the image of the biometric data to be identified (400, 700) and wherein the looping back step (1214) consist of a looping back of the process to the transformation step (1204).

\* \* \* \* \*